United States Patent
Kazuyoshi et al.

(10) Patent No.: US 7,852,447 B2
(45) Date of Patent: Dec. 14, 2010

(54) LIQUID CRYSTAL DISPLAY DEVICE INCLUDING A PIXEL ELECTRODE HAVING A PLURALITY OF PIXEL HOLES WITH CONCENTRIC STRUCTURE

(75) Inventors: Nagayama Kazuyoshi, Kanagawa-ken (JP); Momoi Yuichi, Kanagawa-ken (JP)

(73) Assignee: LG Display Co., Ltd., Seoul (KR)

( * ) Notice: Subject to any disclaimer, the term of this patent is extended or adjusted under 35 U.S.C. 154(b) by 465 days.

(21) Appl. No.: 11/647,551

(22) Filed: Dec. 28, 2006

(65) Prior Publication Data

US 2007/0165175 A1  Jul. 19, 2007

(30) Foreign Application Priority Data

Dec. 28, 2005  (JP)  ............ P2005-379710

(51) Int. Cl.
 *G02F 1/1343* (2006.01)
(52) U.S. Cl. ............ 349/144; 349/141; 349/142; 349/143
(58) Field of Classification Search ......... 349/129, 349/141–144
 See application file for complete search history.

(56) References Cited

U.S. PATENT DOCUMENTS

| | | | |
|---|---|---|---|
| 5,162,933 A | 11/1992 | Kakuda et al. | |
| 5,317,433 A | 5/1994 | Miyawaki et al. | |
| 5,339,181 A | 8/1994 | Kim et al. | |
| 5,462,887 A | 10/1995 | Gluck | |
| 5,646,705 A * | 7/1997 | Higuchi et al. | 349/143 |
| 5,668,379 A | 9/1997 | Ono et al. | |
| 5,731,856 A | 3/1998 | Kim et al. | |
| 5,771,083 A | 6/1998 | Fujihara et al. | |
| 5,793,460 A | 8/1998 | Yang | |
| 5,847,781 A | 12/1998 | Ono et al. | |
| 6,100,950 A * | 8/2000 | Tanaka | 349/47 |
| 6,285,431 B2 * | 9/2001 | Lyu et al. | 349/143 |
| 6,384,889 B1 * | 5/2002 | Miyachi et al. | 349/143 |
| 6,747,712 B2 * | 6/2004 | Noh et al. | 349/39 |

FOREIGN PATENT DOCUMENTS

| | | |
|---|---|---|
| CN | 1607441 A | 4/2005 |
| CN | 1693951 A | 11/2005 |
| JP | 5-72529 | 3/1993 |

OTHER PUBLICATIONS

First Office Action issued in corresponding Chinese Application No. 2006101682501. issued Mar. 7, 2008.

* cited by examiner

*Primary Examiner*—Hoan C Nguyen
(74) *Attorney, Agent, or Firm*—Brinks Hofer Gilson & Lione

(57) ABSTRACT

A liquid crystal display device is disclosed, which can improve the visibility for all directions, the liquid crystal display device includes: a common electrode; and a plurality of pixels, wherein each pixel includes a pixel electrode provided with pixel holes in a display control area, to thereby orient liquid crystal molecules of a liquid crystal in a radial pattern, and wherein the common electrode faces the plurality of pixel electrodes.

3 Claims, 5 Drawing Sheets

R Pixel

G Pixel

B Pixel 10   10   10

Case of black screen

▨ Common electrode
▦ Pixel electrode

Case of white screen

▨ Common electrode
▦ Pixel electrode

Case of black screen

Common electrode

Pixel electrode

Case of white screen

Common electrode

Pixel electrode

LIQUID CRYSTAL DISPLAY DEVICE INCLUDING A PIXEL ELECTRODE HAVING A PLURALITY OF PIXEL HOLES WITH CONCENTRIC STRUCTURE

This application claims the benefit of the Japanese Patent Application No. P2005-379710, filed on Dec. 28, 2005, which is hereby incorporated by reference for all purposes as if fully set forth herein.

BACKGROUND OF THE INVENTION

1. Field of the Invention

The present invention relates to a liquid crystal display (LCD) device that uses n-type liquid crystal to control a viewing angle.

2. Discussion of the Related Art

Liquid crystal display (LCD) devices, especially, liquid crystal displays adopting thin film transistors (TFT) have been widely used in various applications from mobile phones to large-sized televisions.

When several persons view one LCD device together, it is preferable to provide an LCD device that realizes a wide viewing angle so that the several persons may view displayed information together from the front and side locations.

Hereinafter, a related art LCD device will be explained with reference to the accompanying drawings (Japanese Unexamined Publication No. 5-72529). A common electrode is exposed by a pixel hole in a pixel electrode where the pixel hole has a shape of "<" or ">" to improve the control for a viewing angle.

FIG. 4 is a plan view illustrating RGB pixels in a related art LCD device. FIG. 5 is a view illustrating an operation of liquid crystal molecules as a voltage is applied to a related art LCD device.

As shown in FIG. 4, the related art LCD device includes a common electrode exposed and shown with a shape of "<" to prescribe the inclination direction of the liquid crystal.

As shown in FIG. 5A, if the voltage is not applied to the LCD device, the liquid crystal molecules are aligned vertically.

If a voltage is applied to the LCD device, the liquid crystal molecules are inclined in a direction according to the effect of the inclined electric field from the common electrode, that is, the direction perpendicular to the length of the common electrode, as shown in FIG. 5B.

As the liquid crystal molecules are inclined in the two directions corresponding to the two arms of the common electrode shaped in a "<" shape so that the LCD device may achieve a good viewing angle.

However, the related art LCD device has the following disadvantages.

Even though the visibility for the specific direction in the LCD device can be improved due to the "<"-shaped common electrode, it is impossible to realize the visibility for all directions.

SUMMARY OF THE INVENTION

An advantage of the present invention is to provide an FFS mode LCD device that may improve the visibility for all directions.

A liquid crystal display device is disclosed that includes: a common electrode; and a plurality of pixels, wherein each pixel includes a pixel electrode provided with pixel holes in a display control area, to thereby orient liquid crystal molecules of a liquid crystal in a radial pattern, and wherein the common electrode faces the plurality of pixel electrodes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to an embodiment of the present invention, examples of which is illustrated in the accompanying drawings.

Wherever possible, the same reference numbers will be used throughout the drawings to refer to the same or like parts.

Hereinafter, an LCD device according to the present invention will be described with reference to the accompanying drawings.

Figure 1:
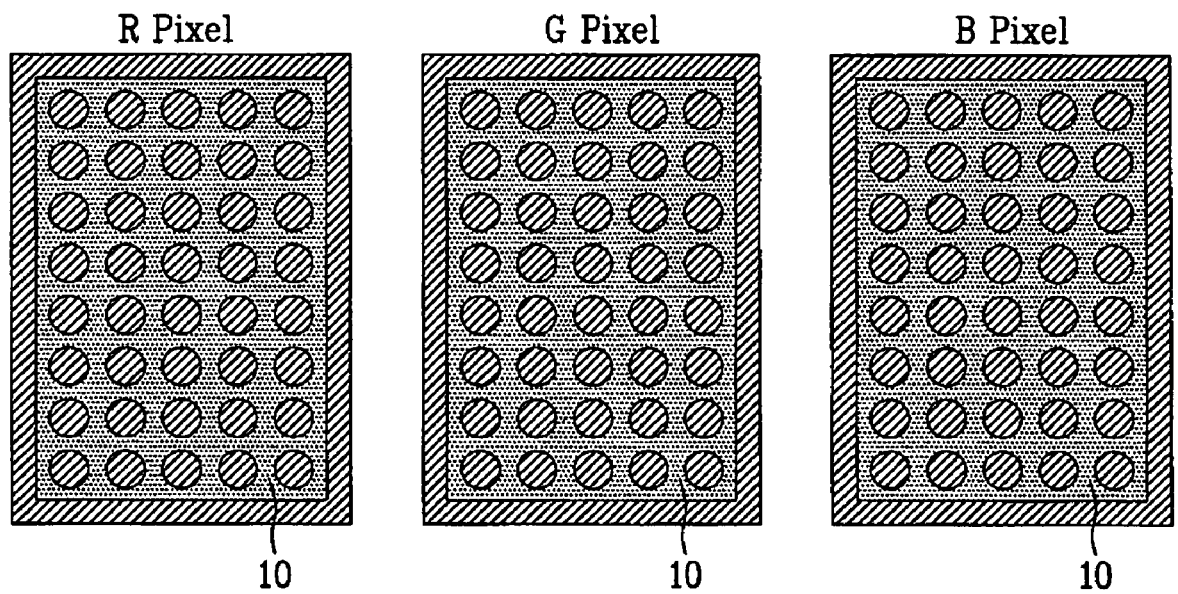
FIG. 1 is a plan view illustrating each of RGB pixels in an LCD device according to the first embodiment of the present invention.

FIG. 1 is a plan view illustrating each of RGB pixels in an LCD device according to the first embodiment of the present invention.

As shown in FIG. 1, each of the RGB pixels is provided with a pixel electrode 10 and a common electrode, wherein the pixel electrode 10 includes circular-shaped pixel holes.

In FIG. 1, the pixel electrode 10 includes the circular or elliptical pixel holes, whereby the common electrode is exposed through the circular or elliptical pixel holes.

In the above-mentioned LCD device according to the present invention, the pixel electrode 10 is provided with the circular or elliptical pixel holes so that liquid crystal molecules of n-type liquid crystal are inclined to various directions.

As a voltage is applied to each of the RGB pixels or not, the operation of liquid crystal molecules is explained as follows.

FIG. 2 is a view of illustrating the operation of liquid crystal molecules in the pixel provided with the pixel electrode 10 including the circular-shaped pixel hole according to the first embodiment of the present invention.

Figure 2A:
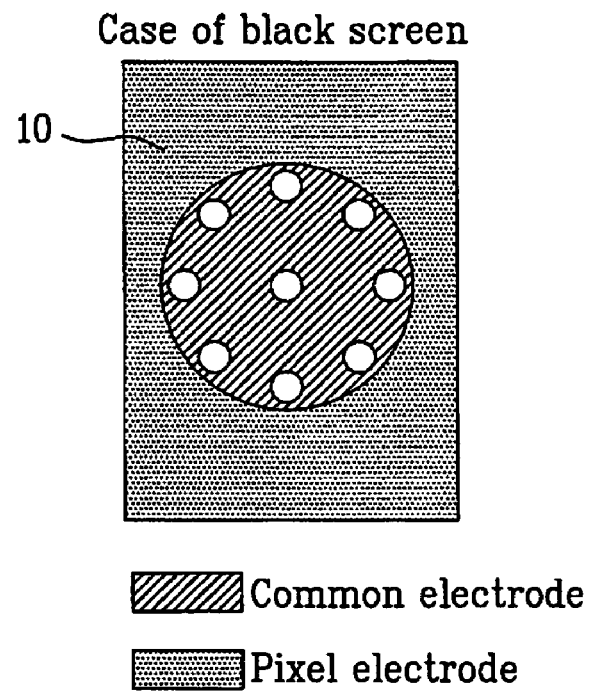
FIGS. 2A and 2B illustrate the operation of liquid crystal molecules in a pixel with a pixel electrode including a circular-shaped pixel hole according to the first embodiment of the present invention.

As shown in FIG. 2A, if the voltage is not applied to the LCD device, the liquid crystal molecules are aligned vertically, whereby the pixel is displayed as the black. In this case, the display is recognized as black from the front and side viewing angles.

Figure 2B:
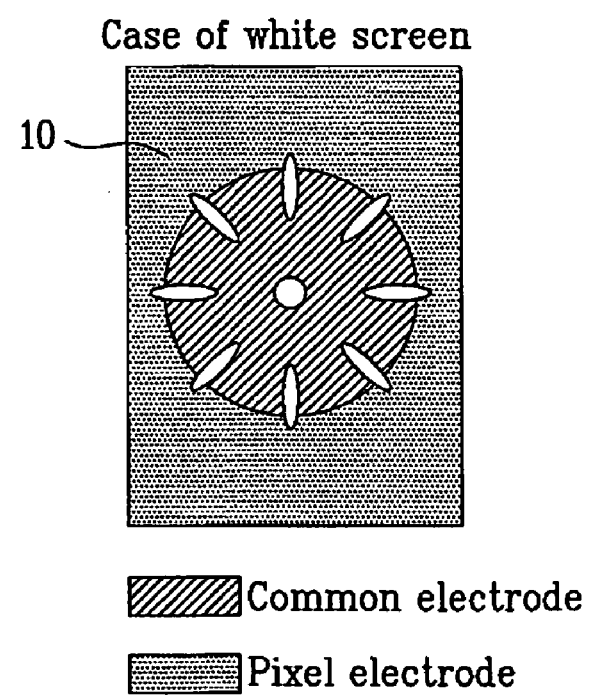

If the voltage is applied to the LCD device, as shown in FIG. 2B, the liquid crystal molecules are inclined in the predetermined direction decided by the pixel electrode 10 having the circular-shaped pixel hole, that is, the direction is perpendicular to the outer circumference of the pixel electrode 10 including the circular-shaped pixel hole. As a result, the white display may be viewed from the front and side locations, that is, all directions.

Each of the RGB pixels includes the pixel electrode 10 provided with the circular-shaped pixel hole, whereby a bright display for all viewing angles may be realized by applying the voltage to the desired pixel. Thus, each of the RGB pixels may represent the color display by increasing the visibility at front and side viewing angles.

According to the LCD device according to the first embodiment of the present invention, the pixel electrode including the circular-shaped pixel hole is formed in the pixel so that it is possible to improve the visibility in all directions.

Furthermore, the circular shape of the pixel electrode is manufactured using the same fabrication process, whereby the LCD device having good visibility for all viewing angles may be easily fabricated.

Hereinafter, an LCD device according to the second embodiment of the present invention will be explained as follows.

For the LCD device according to the second embodiment of the present invention, a pixel electrode 10 has a different shape from the first embodiment of the present invention.

Figure 3:
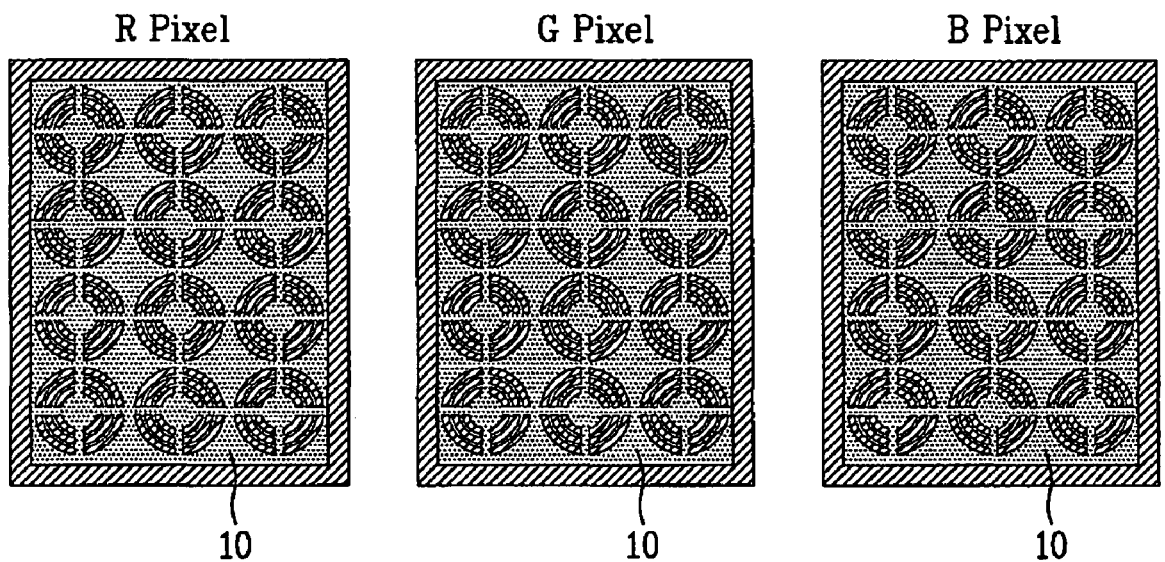
FIG. 3 is a plan view illustrating each of RGB pixels in an LCD device according to the second embodiment of the present invention.
Figure 4:
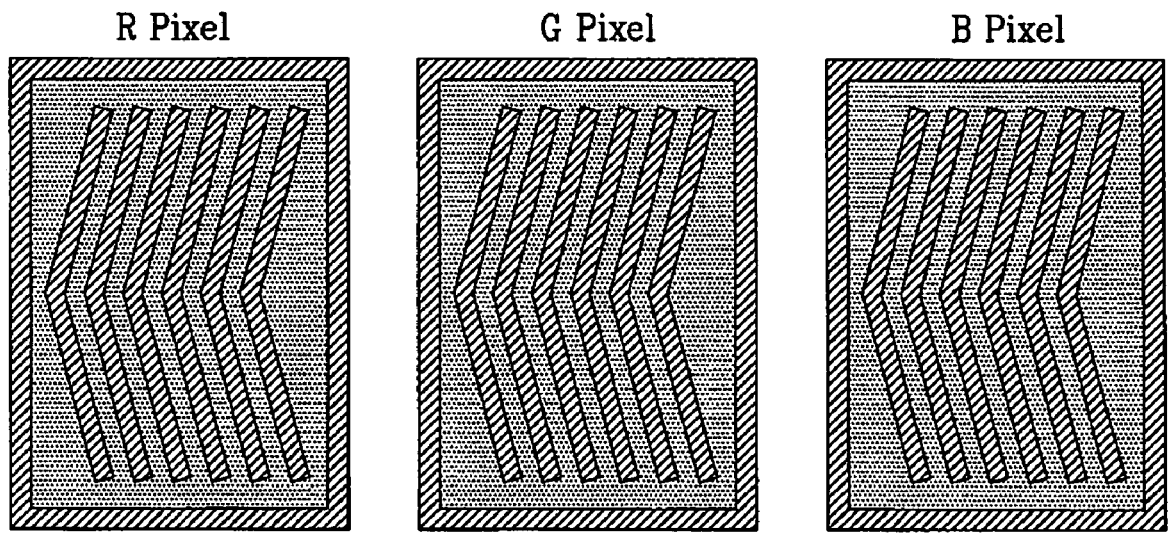
FIG. 4 is a plan view illustrating each of RGB pixels in a related art LCD device.
Figure 5A:
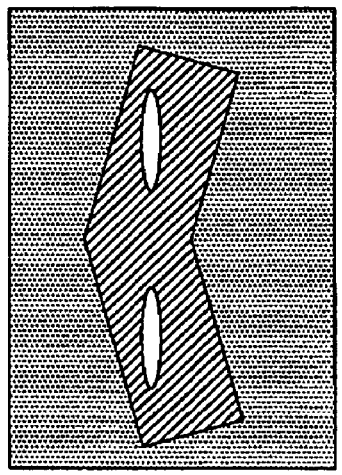
FIGS. 5A and 5B illustrate the operation of liquid crystal molecules according as a voltage is applied to a related art LCD device or not.
Figure 5A:
Figure 5A:
Figure 5B:
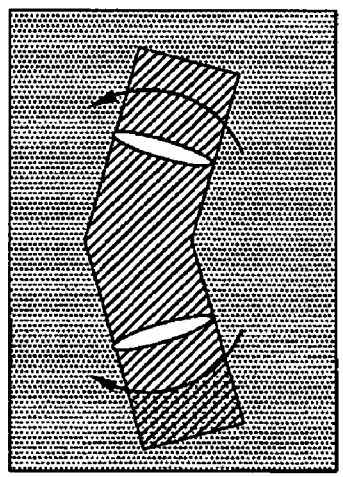
Figure 5B:
Figure 5B:

FIG. 3 is a plan view illustrating each of RGB pixels in an LCD device according to the second embodiment of the present invention.

Referring to FIG. 3, a pixel electrode 10 has pixel holes of concentric circles. As the pixel electrode 10 includes pixel holes of concentric circles, a common electrode is exposed and shown in the shape of concentric circles, as shown in FIG. 3.

If using the above-shaped pixel electrode 10, the liquid crystal molecules are inclined along the concentric circles, based on the same effect explained with reference to FIG. 2.

In the LCD device according to the second embodiment of the present invention, bright display for all the viewing directions may be realized by applying a voltage to the desired pixel. Also, each of the RGB pixels may improve the color display by increasing the visibility of the front and side viewing angles.

According to the LCD device of the second embodiment of the present invention, the pixel electrode including the pixel holes of the concentric circles is formed in the pixel so that it is possible to improve the visibility in all directions.

Furthermore, the concentric circular shape of the pixel electrode is manufactured using the same fabrication process, whereby the LCD device having good visibility for all viewing angles may be easily fabricated.

Also, it is possible to obtain various viewing angle characteristics according to the design of the pixel electrode, for example, the shape of the pixel electrode, the size of the pixel electrode, and the interval between each of the pixel electrodes.

Further in other embodiments of the present invention the pixel holes may have the shape of an ellipse an oval. The shape of pixel holes may also have the shape of a triangle, square, pentagon, hexagon, octagon, etc. The shape of the pixel holes may be any regular or irregular polygon. Also, these pixel holes may have a concentric structure with any of the above identified shapes. The pixel holes may be arranged at regular or irregular intervals. Also, where applicable, the orientation of shapes of the pixel holes may vary in a regular or irregular manner. Additionally, the pixel holes may have multiple different shapes.

As mentioned above, the LCD device according to the present invention has the following advantages.

In the LCD device according to the present invention, the pixel electrode including the circular shaped pixel holes orients the liquid crystal molecules in a radial manner, thereby improving the visibility for all viewing angles.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
a plurality of pixels, wherein each pixel includes a pixel electrode provided with a plurality of pixel holes having at least two different shapes and a common electrode, and
wherein the plurality of pixel holes are arranged to form a concentric structure.

2. The device of claim 1, wherein the concentric pixel holes are arranged at regular intervals.

3. The device of claim 1, wherein the concentric pixel holes are arranged at irregular intervals.

* * * * *